United States Patent
Tashiro et al.

(10) Patent No.: US 9,293,878 B2
(45) Date of Patent: Mar. 22, 2016

(54) WATERPROOF CONNECTOR COMPRISING A REAR HOLDER WITH ENGAGING PORTIONS

(71) Applicant: YAZAKI CORPORATION, Tokyo (JP)

(72) Inventors: Harunori Tashiro, Kakegawa (JP); Kengo Aoshima, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/531,259

(22) Filed: Nov. 3, 2014

(65) Prior Publication Data
US 2015/0050826 A1 Feb. 19, 2015

Related U.S. Application Data

(63) Continuation of application No. PCT/JP2013/002746, filed on Apr. 23, 2013.

(30) Foreign Application Priority Data

May 16, 2012 (JP) .................. 2012-112286

(51) Int. Cl.
*H01R 13/52* (2006.01)
*H01R 13/40* (2006.01)
(Continued)

(52) U.S. Cl.
CPC .............. *H01R 39/08* (2013.01); *B60R 16/027* (2013.01); *H01R 35/025* (2013.01); *H01R 35/04* (2013.01); *Y10T 403/32254* (2015.01); *Y10T 403/32975* (2015.01)

(58) Field of Classification Search
CPC ............... H01R 13/52; H01R 13/5202; H01R 13/5205; H01R 13/502; H01R 13/5208; H01R 13/62; H01R 13/627

USPC .......................... 439/271–278, 587, 352–358
See application file for complete search history.

(56) References Cited

U.S. PATENT DOCUMENTS 5,347,084 A * 9/1994 Roney .................. G02B 6/4447
174/92
5,934,938 A 8/1999 Clark et al.
(Continued)

FOREIGN PATENT DOCUMENTS

CN 2634674 Y 8/2004
EP 1 079 470 A1 2/2001
(Continued)

OTHER PUBLICATIONS

International Search Report for PCT/JP2013/002746 dated Jul. 17, 2013 [PCT/ISA/210].
(Continued)

*Primary Examiner* — Chandrika Prasad
(74) *Attorney, Agent, or Firm* — Sughrue Mion, PLLC

(57) ABSTRACT

A rear holder includes a paired mating members in an identical shape to be coupled with each other with contact surfaces of the mating members being in contact with each other and with the electric wires being interposed in between the mating members. The mating members form wire housing portions for housing the corresponding electric wires with the contact surfaces being in contact with each other. The mating members include engaging portions configured to symmetrically engage with each other with the contact surfaces being in contact with each other to keep an coupled state of the mating members.

3 Claims, 4 Drawing Sheets

(51) Int. Cl.
*H01R 39/08* (2006.01)
*H01R 35/04* (2006.01)
*B60R 16/027* (2006.01)
*H01R 35/02* (2006.01)

(56) References Cited

U.S. PATENT DOCUMENTS

| | | | | |
|---|---|---|---|---|
| 6,162,085 | A * | 12/2000 | Chugh | H01R 13/5825 |
| | | | | 439/275 |
| 6,250,962 | B1 * | 6/2001 | Shinozaki | H01R 13/5208 |
| | | | | 439/275 |
| 6,331,124 | B1 * | 12/2001 | Miyazaki | H01R 13/5208 |
| | | | | 439/587 |
| 7,270,556 | B2 * | 9/2007 | Mori | H01R 13/5208 |
| | | | | 439/272 |
| 8,087,948 | B2 * | 1/2012 | Ambo | H01R 13/5205 |
| | | | | 439/271 |
| 2012/0021632 | A1 | 1/2012 | Matsumoto et al. | |
| 2014/0073163 | A1 * | 3/2014 | Kojima | H01R 13/5205 |
| | | | | 439/275 |

FOREIGN PATENT DOCUMENTS

| | | |
|---|---|---|
| EP | 2 023 447 A2 | 2/2009 |
| JP | 2005-85497 A | 3/2005 |
| JP | 3702784 B2 | 10/2005 |
| WO | 2010/110278 A1 | 9/2010 |
| WO | 2011/096590 A1 | 8/2011 |

OTHER PUBLICATIONS

Written Opinion for PCT/JP2013/002746 dated Jul. 17, 2013 [PCT/ISA/237].

Communication dated Oct. 20, 2015 from the Japanese Patent Office in counterpart application No. 2012-112286.

Communication dated Dec. 28, 2015 from the State Intellectual Property Office of the P.R.C. in counterpart application No. 201380025104.1.

* cited by examiner

WATERPROOF CONNECTOR COMPRISING A REAR HOLDER WITH ENGAGING PORTIONS

CROSS REFERENCE TO RELATED APPLICATION

This application is a Continuation of PCT Application No. PCT/JP2013/002746, filed on Apr. 23, 2013, and claims the priority of Japanese Patent Application No. 2012-112286, filed on May 16, 2012, the content of both of which is incorporated herein by reference.

BACKGROUND

1. Technical Field

The present invention relates to a waterproof connector.

2. Related Art

There is known a waterproof connector, as proposed in International Publication WO 2010/110278, which includes a housing which houses a terminal connected to an electric wire, a waterproof member provided between the housing and the electric wire to define the inside and the outside of the housing, and a rear holder which prevents the waterproof member attached to the housing from coming off the housing. In the waterproof connector, the rear holder is composed of two members, which are a first holder body and a second holder body. One of the holder bodies is provided with a locking projection, and the other is provided with a locking recess which engages with the locking projection. The locking projection and the locking recess engage with each other so that the first holder body is coupled with the second holder body to function as the rear holder.

SUMMARY

However, in the waterproof connector as described in International Publication WO 2010/110278, since the first holder body and the second holder body composing the rear holder have different shapes provided with the locking projection and the locking recess, respectively, two different types of members are required to compose the rear holder. As a result, manufacturing costs increase in association with the increase of the number of components and dies.

It is an object of the present invention to provide a waterproof connector capable of contributing to reducing the number of components and manufacturing costs.

A waterproof connector in accordance with some embodiments includes a housing for housing terminals connected to electric wires, a waterproof member provided between the housing and the electric wires to define an inside and an outside of the housing, and a rear holder attached to the housing and configured to prevent the waterproof member from coming off the housing. The rear holder includes a paired mating members in an identical shape to be coupled with each other with contact surfaces of the mating members being in contact with each other and with the electric wires being interposed in between the mating members. The mating members forms wire housing portions for housing the corresponding electric wires with the contact surfaces being in contact with each other. The mating members include engaging portions configured to symmetrically engage with each other with the contact surfaces being in contact with each other to keep an coupled state of the mating members.

According to the configuration described above, only one type of member is required to compose the rear holder since the rear holder is formed by the pair of mating members having the same shape. Therefore, manufacturing costs can be reduced due to the reduction in the number of components and dies.

The mating members are provided with the engaging members that symmetrically engage with each other to keep the mutual coupled state of the mating members with their respective contact surfaces in contact. Therefore, the mating members having the identical shape can keep the mutual coupled state by the engaging members, and an influence of wire bending on the waterproof members can be avoided.

Accordingly, the waterproof connector having such a configuration can contribute to reducing the number of components and manufacturing costs since only one type of the mating member is required to be prepared to compose the rear holder.

The engaging portions may include engaging recesses and engaging projections to be inserted in the corresponding engaging recesses.

According to the configuration described above, each engaging member is provided with the engaging recess and the engaging projection inserted in the engaging recess to engage with each other. Therefore, the respective engaging members can be prevented from being disengaged because of external force applied from various directions, such as wire swing or rolling. Accordingly, the coupled state of the mating members can surely be kept.

The engaging portions may be configured to engage with each other by bringing the mating members closer to each other in an extending direction of the electric wires to bring the contact surfaces into contact with each other and inserting the engaging projections in the corresponding engaging recesses.

According to the configuration described above, the respective engaging members engage with each other in a manner such that the respective mating members come closer in the extending direction of the electric wires to bring the respective contact surfaces into contact with each other such that each engaging projection is inserted into each engaging recess. Therefore, each of the mating members can be attached to the housing separately even when one of the mating members has been already attached to the housing. Accordingly, it is possible to expand the possibility of attachment performance and adjustment of each component.

Each of the engaging portions may be provided in a middle portion of the contact surfaces between the wire housing portions.

According to the configuration described above, each engaging member is provided in the middle portion of the contact surfaces. Therefore, it is not necessary to provide plural engaging members in several portions of each mating member, for example, on both sides of the contact surfaces. Accordingly, only one engaging member is required for each mating member to keep the mutual coupled state of the mating members.

Consequently, it is possible to provide the waterproof connector capable of contributing to reducing the number of components and manufacturing costs.

DETAILED DESCRIPTION

Figure 1:
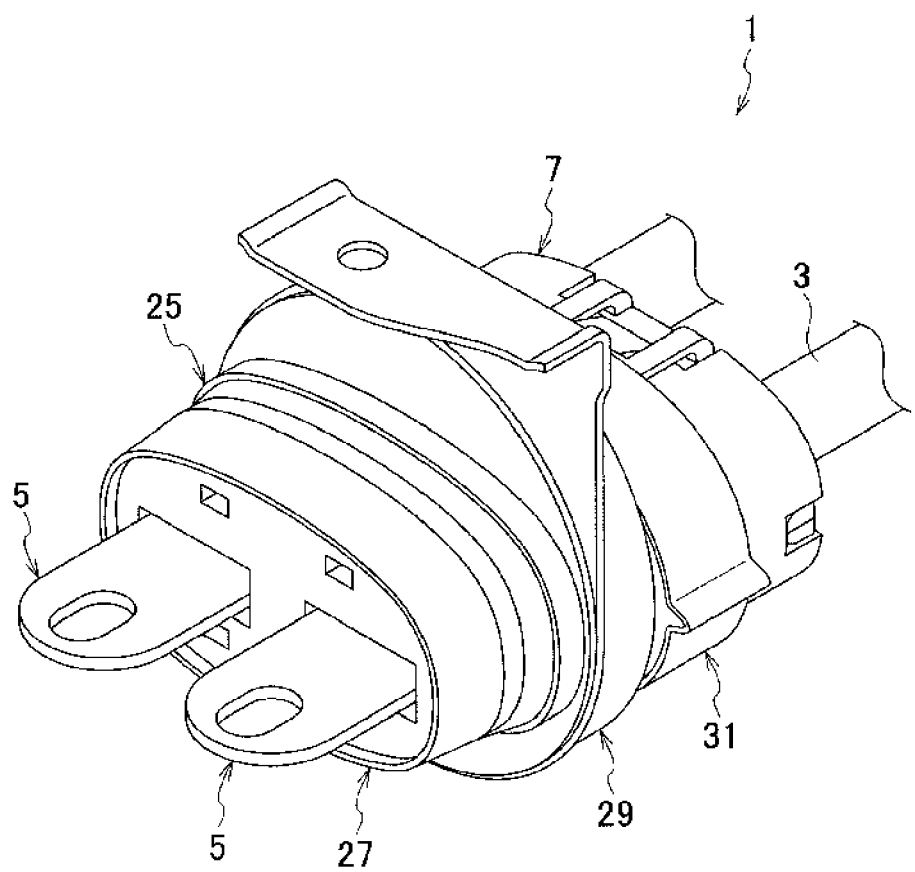
FIG. 1 is a perspective view of a waterproof connector according to an embodiment of the present invention.
Figure 2:
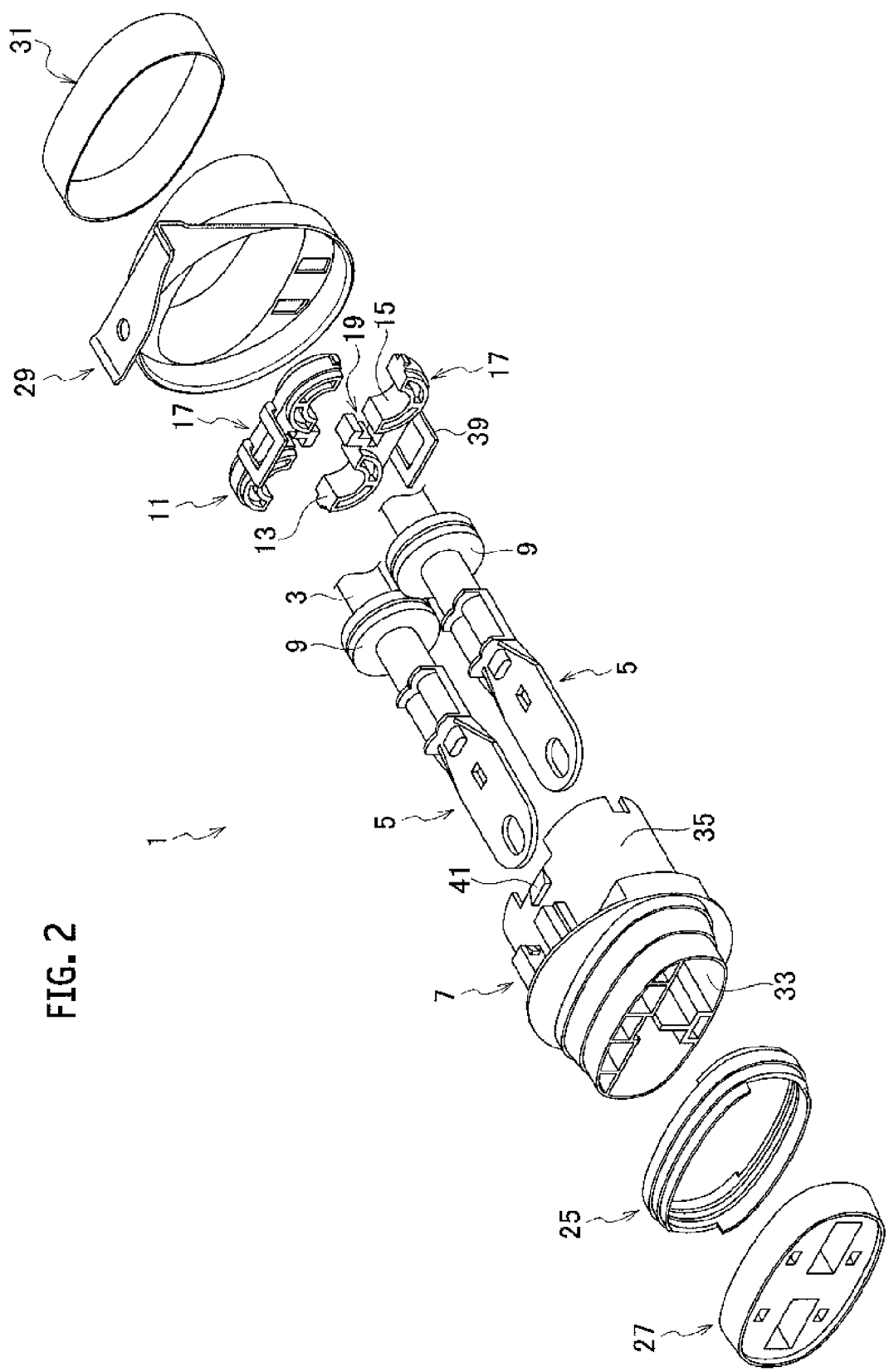
FIG. 2 is an exploded perspective view of the waterproof connector according to the embodiment of the present invention.
Figure 3:
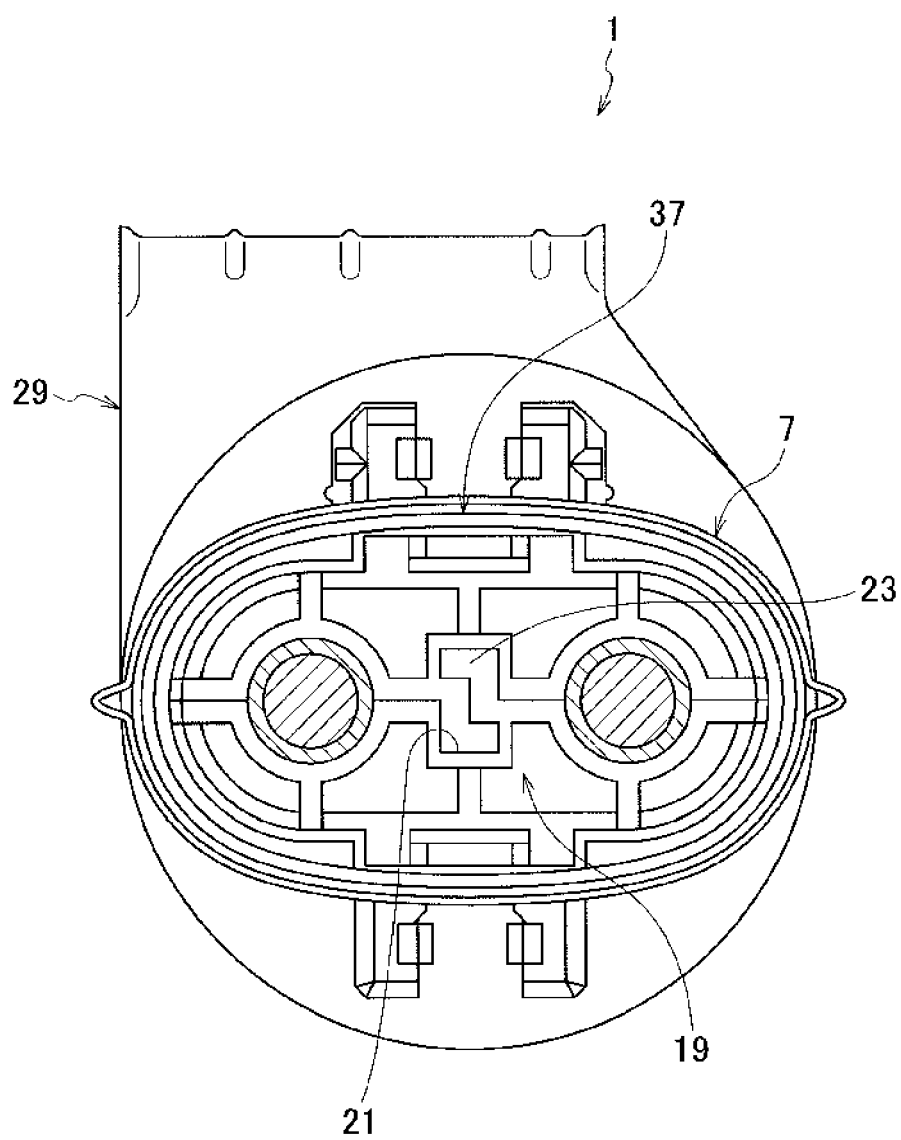
FIG. 3 is a front view of the waterproof connector according to the embodiment of the present invention as viewed from the rear holder side.
Figure 4:
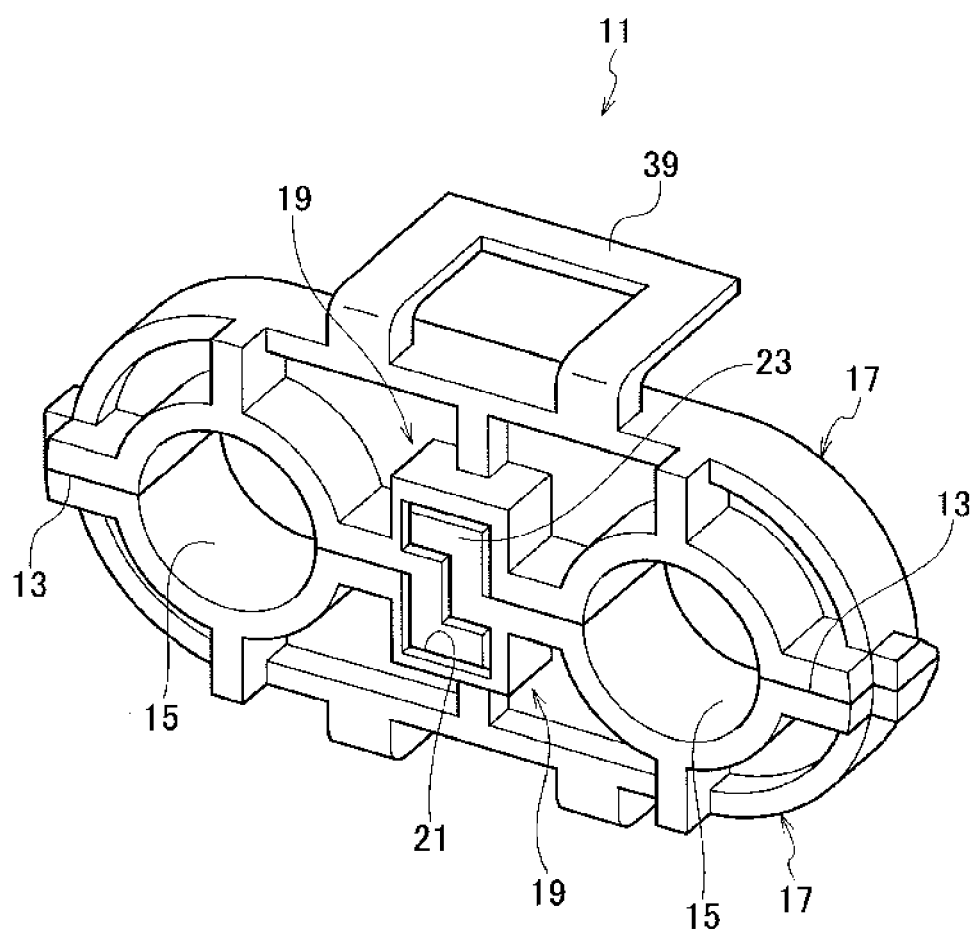
FIG. 4 is a perspective view of the rear holder of the waterproof connector according to the embodiment of the present invention.

Hereinafter, a waterproof connector according to an embodiment of the present invention will be explained with reference to the FIG. 1 to FIG. 4.

A waterproof connector 1 according to the present embodiment includes a housing 7 that houses terminals 5 connected to electric wires 3, waterproof members 9 provided between the housing 7 and each electric wire 3 so as to define the inside and the outside of the housing 7, and a rear holder 11 attached to the housing 7 to prevent the waterproof members 9 from coming off the housing 7.

The rear holder 11 is composed of a pair of mating members 17, 17 having the same shape and coupled in a manner as to bring the respective contact surfaces 13, 13 into contact with each other while interposing the electric wires 3 therebetween and thereby forming wire housing portions 15, 15 for housing the electric wires 3. The mating members 17 are provided with engaging members 19 which symmetrically engage with each other while the respective contact surfaces 13, 13 come face-to-face so as to keep the mutual coupled state of the mating members 17.

The respective engaging members 19 are provided with an engaging recess 21 and an engaging projection 23 inserted into the engaging recess 21.

The respective engaging members 19 engage with each other in a manner such that the respective mating members 17, 17 come closer in the extending direction of the electric wires 3 to bring the respective contact surfaces 13, 13 into contact with each other such that each engaging projection 23 is inserted into each engaging recess 21.

Each engaging member 19 is provided in the middle of the contact surfaces 13 of the respective mating members 17.

As shown in FIG. 1 to FIG. 4, the waterproof connector 1 includes the terminals 5 connected to the electric wires 3, the housing 7, a packing 25, a front holder 27, a shell 29, a shield ring 31, the waterproof members 9, and the rear holder 11.

The terminals 5 are terminal metal fittings which are electrically connected, by press-fastening, to end portions of the plural (two in this embodiment) electric wires 3 connected to other members such as loads. The terminals 5 are connected to a high-current circuit housed in the casing (not shown in the figures). The terminals 5 are housed in the housing 7.

The housing 7 is made of insulating resin and formed into a cylindrical shape, and includes a terminal housing portion 33 for housing the terminals 5 therein, and a wire leading portion 35 communicated with the terminal housing portion 33 and leading the electric wires 3 therein. The housing 7 is fitted in the casing on the terminal housing portion 33 side so that the terminals 5 are connected to the high-current circuit. The housing 7 with such a configuration is provided with the packing 25 attached to the periphery of the terminal housing portion 33.

The packing 25 is made of an elastic material such as rubber, and is tightly attached to the periphery of the terminal housing portion 33 of the housing 7. The packing 25 seals the gap between the housing 7 and the casing so as to define the inside and the outside of the housing 7 and define the inside and the outside of the casing, in the state in which the housing 7 is fitted in the casing. The front holder 27 is attached to the opening of the terminal housing portion 33 of the housing 7 to which the packing 25 is attached.

The front holder 27 is made of insulating resin and formed into a lid shape. The front holder 27, through which connecting portions of the terminals 5 are inserted, is attached to the housing 7 in a manner as to cover the opening of the terminal housing portion 33 of the housing 7. The front holder 27 locks the terminals 5 with lances or the like so as to prevent the terminals 5 from being removed from the housing 7. The shell 29 is attached, on the wire leading portion 35 side, to the housing 7 to which the front holder 27 is attached.

The shell 29 is made of a shield material for preventing entrance or leaking of noise and the like, and is attached to the periphery of the housing 7 on the wire leading portion 35 side. The shell 29 is press-fastened with the shield ring 31 together with a braided wire (not shown in the figures).

The shield ring 31 is made of a conductive material. The shield ring 31 is provided on the periphery of the shell 29 to press-fasten the braided wire and the shell 29 together so as to form a shield circuit. The waterproof members 9 are provided inside of the wire leading portion 35 of the housing 7 to which the shield ring 31 is attached.

The waterproof members 9 are formed into a rubber plug, and are provided inside of the wire leading portion 35 of the housing 7 in a manner such that inner circumferences of the waterproof members 9 are in close contact with outer circumferences of the electric wires 3. Outer circumferences of the waterproof members 9 come into close contact with the inner surface of the wire leading portion 35 of the housing 7 and seal the gap between the housing 7 and the electric wires 3 so as to define the inside and the outside of the housing 7. The waterproof members 9 are prevented from coming off the housing 7 due to the rear holder 11 attached to the opening of the wire leading portion 35 of the housing 7.

The rear holder 11 is made of insulating resin, and is composed of the pair of mating members 17 having the same semi-elliptical shape that are coupled with each other with the respective contact surfaces 13, 13 in contact while interposing the electric wires 3. The mating members 17 are provided with semicircular grooves to form the wire housing portions 15 for housing the electric wires 3 by the coupling of the two mating members 17, 17. The inner diameter of the wire housing portions 15 is set to be smaller than the outer diameter of the electric wires 3, so as to prevent loosening of the electric wires 3 in the rear holder 11 inside of the wire leading portion 35 because of wire bending. The mating members 17 having such a configuration are provided with the engaging portions 19.

Each engaging portion 19 is provided in the middle portion of the contact surfaces 13 and located between the wire housing portions 15, 15. Each engaging portion 19 is provided with the engaging recess 21 and the engaging projection 23. The engaging recess 21 is a groove formed into an L-shape in which the engaging projection 23 of the opposite mating member 17 is inserted. Each engaging projection 23 projects from the contact surface 13, and is formed into an inverse L-shape of the engaging recess 21.

Since the engaging recess 21 and the engaging projection 23 are formed into a symmetrical shape, the engaging recess 21 of one mating member 17 engages with the engaging projection 23 of the other mating member 17, and the engaging projection 23 of one mating member 17 engages with the engaging recess 21 of the other mating member 17, in the state in which the mating members 17, 17 are coupled with each other with the contact surfaces 13, 13 in contact. Due to the engagement of the respective engaging portions 19, it is possible to prevent the mating members 17, 17 from moving in the direction away from the opposed contact surfaces 13 or from moving along the contact surfaces 13, and thereby keep the mutual coupled state of the mating members 17, 17.

The respective engaging members 19 engage with each other in a manner such that the respective mating members 17, 17 come closer in the extending direction of the electric wires 3 to bring the contact surfaces 13, 13 into contact with each other so that the engaging projection 23 of one mating member 17 is inserted into the engaging recess 21 of the other mating member 17. Therefore, even when one of the mating members 17 has been already attached to the opening of the wire leading portion 35 of the housing 7, the other engaging member 17 can be attached to the opening of the wire leading portion 35 of the housing 7 afterward so that the engaging members 19 engage with each other. The state in which the rear holder 11 composed of the pair of mating members 17, 17 having the identical shape is attached to the housing 7, is maintained by a lock unit 37.

The lock unit 37 includes lock recesses 39 formed in the mating members 17, and lock projections 41 formed in the housing 7. The lock recesses 39 are flexibly provided on circumferences of the respective mating members 17, and are locked with the lock projections 41 in the state in which the mating members 17 are attached to the housing 7. The lock projections 41 project from the peripheral surface of the housing 7. The lock projections 41 bend the lock recesses 39 at the point of inserting the mating members 17 into the wire leading portion 35 of the housing 7, and then lock the lock recesses 39 when the mating members 17 are attached to the housing 7.

The attached state of the rear holder 11 to the housing 7 is maintained by the lock recesses 39 locked with the lock projections 41. Therefore, since the rear holder 11 is securely attached to the housing 7, the waterproof members 9 can surely be prevented from coming off the housing 7 by the rear holder 11.

In the waterproof connector 1, the rear holder 11 is composed of the pair of mating members 17, 17 having the identical shape. Therefore, the same members can be used to compose the rear holder 11 and as a result, it is possible to reduce the number of components and dies, and thereby reduce manufacturing costs.

The mating members 17 are provided with the engaging portions 19 that symmetrically engage with each other to keep the mutual coupled state of the mating members 17 with the respective contact surfaces 13, 13 in contact. Therefore, the mating members 17 with the identical shape can keep the mutual coupled state by the engaging portions 19, and an influence of bending of the electric wires 3 on the waterproof members 9 can be avoided.

Thus, in the waterproof connector 1, since the rear holder 11 is composed of the same mating members 17, it is possible to reduce the number of components and manufacturing costs.

The engaging members 19 include the engaging recesses 21 and the engaging projections inserted in the engaging recesses 21. Therefore, it is possible to prevent the engaging members 19 from being disengaged because of external force applied from various directions, such as wire swing or rolling, and thereby to securely keep the mutual coupled state of the mating members 17, 17.

The respective engaging members 19 engage with each other in a manner such that the respective mating members 17 come closer in the extending direction of the electric wires 3 to bring the respective contact surfaces 13, 13 into contact with each other such that each engaging projection 23 is inserted into each engaging recess 21. Therefore, even when one of the mating members 17 has been already attached to the housing 7, the other mating member 17 can be attached to the housing 7 afterward. As a result, it is possible to expand the possibility of attachment performance and adjustment of each component.

Each engaging member 19 is provided in the middle portion of the contact surfaces 13. Therefore, it is not necessary to provide plural engaging members 19 in several portions of each mating member 17, for example, on both sides of the contact surfaces 13. Accordingly, only one engaging member 19 is required for each mating member 17 to keep the mutual coupled state of the mating members 17, 17.

The waterproof connector according to the embodiment of the present invention is provided with one engaging portion in the middle portion of the contact surfaces in each mating member, but is not particularly limited to this configuration. For example, the engaging projection may be provided on one side of the contact surface, and the engaging recess may be provided on the other side of the contact surface, as long as the engaging portions can form a symmetrical shape in the state in which the contact surfaces come into contact with each other to couple the respective mating members.

Although each engaging portion includes the engaging projection and the engaging recess, the engaging portion is not limited to this configuration, and may include a projection and a hole into which the projection is inserted with pressure, as long as the engaging portion can keep the coupled state of each mating member.

Although the present invention has been described above by reference to the embodiments and the example, the present invention is not limited to those, and it will be apparent to these skilled in the art that various modifications and improvements can be made.

What is claimed is:

1. A waterproof connector comprising:
a housing for housing terminals connected to electric wires;
a waterproof member provided between the housing and the electric wires; and
a rear holder attached to the housing and configured to prevent the waterproof member from coming off the housing,
wherein the rear holder comprises a pair of mating members having an identical shape to be coupled with each other with contact surfaces of the mating members being in contact with each other and with the electric wires being interposed in between the mating members,
wherein the mating members are configured to form wire housing portions for housing the corresponding electric wires with the contact surfaces being in contact with each other,
wherein the mating members comprise engaging portions configured to symmetrically engage with each other and maintain a coupled state of the mating members with the contact surfaces being in contact with each other,
wherein the engaging portions comprise engaging recesses and engaging projections to be inserted in the corresponding engaging recesses,
wherein the engaging projections are insertable in the corresponding engaging recesses in an extending direction of the electric wires, parallel to an axis of a through hole formed by the wire housing portions, to engage with the corresponding engaging recesses,
wherein the wire housing portions are aligned in a first direction perpendicular to the extending direction of the electric wires, and wherein each of the engaging portions is provided in a middle of the contact surfaces between the wire housing portions in the first direction.

2. The waterproof connector according to claim 1, wherein a cross section of the engaging projections in the extending direction is substantially constant from a back face of the rear holder to a front face of the rear holder.

3. The waterproof connector according to claim 1, wherein an inner diameter of the wire housing portions is set to be smaller than an outer diameter of the electric wires.

* * * * *